United States Patent

Rosenfeld

[15] 3,693,153

[45] Sept. 19, 1972

[54] PARITY CHECK APPARATUS AND METHOD FOR MINICOMPUTERS

[72] Inventor: Peter Ernest Rosenfeld, Berkeley Heights, N.J.

[73] Assignee: Bell Telephone Laboratories, Incorporated, Murray Hill, Berkeley Heights, N.J.

[22] Filed: July 9, 1971

[21] Appl. No.: 161,174

[52] U.S. Cl. .......340/146.1 AG, 235/153, 340/172.5, 444/1

[51] Int. Cl. ..............................................G06f 11/10

[58] Field of Search..340/146.1 AG, 172.5; 235/153; 444/1

[56] References Cited

UNITED STATES PATENTS

| | | | |
|---|---|---|---|
| 3,566,093 | 2/1971 | Joyece et al. | 235/153 |
| 3,569,934 | 3/1971 | Parr, Jr. et al. | 340/146.1 |
| 3,629,825 | 12/1971 | Bloom, Jr. | 340/146.1 |

*Primary Examiner*—Charles E. Atkinson
*Attorney*—R. J. Guenther et al.

[57] ABSTRACT

Apparatus for facilitating the detection and correction of errors in data stored in and communicated to (and from) a small data processor is disclosed. A simple parity checking circuit facilitates a program-controlled error detection process.

6 Claims, 3 Drawing Figures

INVENTOR
P. E. ROSENFELD
BY William Ryan
ATTORNEY

PARITY CHECK APPARATUS AND METHOD FOR MINICOMPUTERS

BACKGROUND OF THE INVENTION

This invention relates to data processing systems. More particularly, this invention relates to improvements to data processing systems to improve the accuracy of data during the course of processing. Still more particularly, the present invention relates to apparatus for improving the accuracy of data communicated through an input-output port of a small digital computer.

Recent years have witnessed greatly increased use of data processing machines generally. One type of machine that has found particularly widespread use is the so-called minicomputer. These machines have been discussed widely in the technical literature. A particularly useful reference is *Computer Organization* by I. Flores, Prentice-Hall, 1969, Chapter 5. A number of differences exist between the large general purpose computers with which many users are acquainted and the smaller, simpler minicomputers. An enlightening article on this subject is "What To Expect When You Scale Down To A Minicomputer," by J. J. Morris, *Control Engineering*, Vol. 17, No. 9, September 1970, pp. 65–71.

One particular feature commonly found in most large scale general purpose computers but not found in most minicomputers is a parity checking and generating apparatus for insuring the accuracy of data processed. Such circuitry is most commonly found as part of the input-output interfaces of large scale general purpose computers and in the various peripheral units associated with it. Because a primary object in using a minicomputer is to minimize overall cost, such parity circuitry is often eliminated completely in minicomputers. Most typically, the function of the parity check circuitry is assumed by a software equivalent. Thus upon each data word transferred to or from a minicomputer, an often lengthy execution sequence must be performed by the minicomputer. The stored program necessary to accomplish this parity checking operation in a minicomputer often occupies a significant number of memory locations in the minicomputer. Since most minicomputers include approximately 4,000 memory locations, it is important to conserve this scarce commodity to the extent possible.

Further, parity checking using a programmed sequence may involve a significant amount of computation time. For many "real time" applications of minicomputers it is important to conserve execution time to the extent possible.

Accordingly, it is an object of the present invention to provide simplified hardware for insuring the accuracy of data transfers to and from a digital computer.

It is another object to provide for simple economic hardware responsive to simplified programming to improve the accuracy of data transfer between a minicomputer and an associated input-output device.

It is a further object of the present invention to provide a single hardware configuration for economically providing program controlled error control operations for a plurality of input/output devices and subsystems.

It is a further object of the present invention to minimize memory usage and execution time associated with verifying the accuracy of input-output data for a minicomputer.

SUMMARY OF THE INVENTION

Briefly stated, the present invention in a typical embodiment provides for a modification to existing minicomputer apparatus in the form of special purpose hardware responsive to a new programmed instruction. This additional apparatus is also responsive to parity checking circuitry of an elementary nature. Thus, upon executing a new checking program instruction, the special circuitry provided by the present invention generates either of two outputs, depending upon the status of a general purpose register in the minicomputer. In particular, when a parity error is detected, a signal is provided which causes the minicomputer to transfer control to a first program instruction (typically following immediately after the checking instruction) for correcting or otherwise dealing with the error. Upon a correct parity indication, the special purpose circuitry of the present invention directs that the input-output operation continue without interruption by skipping over the instruction associated with correcting the error.

BRIEF DESCRIPTION OF THE DRAWING

The present invention will be more fully understood upon considering the following detailed description taken together with the appended drawing wherein.

DETAILED DESCRIPTION

It will be understood by those skilled in the art that the present invention has general applicability in a broad range of data processing and related communication systems. The following detailed description, however, will proceed in the context of a particular small scale general purpose computer. Thus for purposes of illustration the Digital Equipment Corporation (DEC) Model PDP–8/L will be taken as typical of the class of minicomputers and other similar systems to which the present invention is applicable. Only a generalized view of the minicomputer will be presented herein. For further details of the DEC PDP–8/L system (hardware and software) reference is made to the PDP–8/L *User's Handbook*, Digital Equipment Corporation, 1968. Other references describing the PDP–8/L and related systems include *Introduction to Programming*, Digital Equipment Corporation, 1968, and *Small Computer Handbook*, Digital Equipment Corporation, 1967. Another useful reference is the above-mentioned Flores book.

Figure 1:
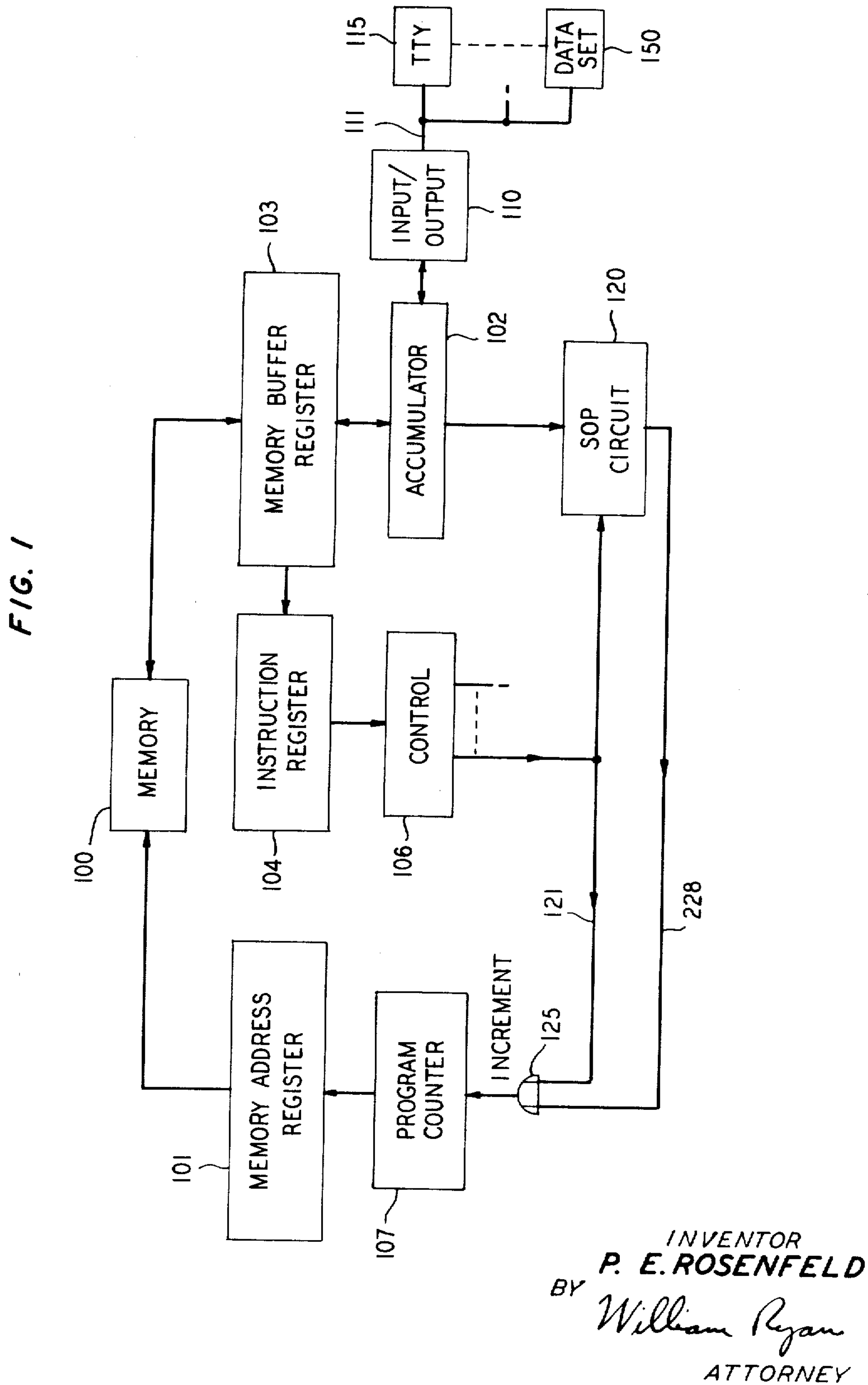
FIG. 1 shows portions of a typical minicomputer configuration as modified in accordance with the present invention.

FIG. 1 shows a block diagram of a typical minicomputer data processing system (e.g., the aforesaid DEC PDP–8/L) in broad outline. Only those functions necessary to an understanding of the present invention are explicitly shown in FIG. 1. In particular, there is shown a memory 100 for storing program and other data to be processed by the system. Memory 100 includes a relatively small number (typically 4,096)

words of memory. In most minicomputer configurations each word contains 12 or 16 bits, although the number of bits in a word is not critical for present purposes. Programs and/or data stored in memory 100 are typically accessed on a word-by-word basis under the control of accessing information stored in memory address register (MAR) 101. Data or operand words (as distinguished from program instruction words) read from memory 100 are temporarily stored in memory buffer register (MBR) 103 before being transferred to a general purpose register such as accumulator 102.

Program instruction words read from memory 100 ordinarily do not proceed to accumulator 102, but are decoded before that point. The instruction-specifying (op-code) portion of a program instruction is typically stored in another register, such as instruction register 104 in FIG. 1 where it is decoded in standard fashion. In some cases additional intermediate storage, modification and other processing of data words read from memory 100 are effected prior to storage in accumulator 102. Since these operations perform no necessary part of the operation of the present invention, they are not presented in detail here.

The block labeled "control" and identified by the numeral 106 represents circuitry responsive to the contents of register 104 for initiating the control signals associated with the execution of particular instructions. In the normal processing of a sequence of program instructions, one of the phases of execution for each instruction is that in which the address from which the next instruction is to be read is determined. If appropriate, this often requires only a simple incrementing of the contents of memory address register 101 in standard fashion. A program counter shown in FIG. 1 by the block 107 usually responds to an increment signal from control circuit 106; counter 107 in turn modifies the contents of register 101. The lead 121 is shown in FIG. 1 as the lead carrying the increment signal to program counter 107.

In other cases, however, the execution of an instruction read from a given location in memory 100 requires that the immediately following instruction be read from a different non-consecutive location in memory 100. Thus, for example, transfer or jump instructions usually specify a memory location other than the one immediately following that at which the jump instruction is stored. In such cases, the desired next location is usually specified by the address portion of the word containing the jump instruction. This next instruction is, of course, subject to modification using standard address modification techniques. In any event, the desired next location is entered into program counter 107 under the control of signals generated by control circuit 106. Program counter 107 then directs the state of memory address register 101 to effect the required access at the appropriate time. Alternately, in some machines, a jump instruction may cause its address portion (as modified by index register contents and the like) to be loaded directly into the memory address register.

Still another means for controlling the selection of the next instruction from memory 100 is the use of so-called skip instructions. Thus, when, for example, a particular flag is set as a result of a prior data processing operation or an existing condition in the system, program counter 107 is arranged to be incremented by two. This causes an instruction in the program to be skipped. A typical skip instruction is the skip on positive accumulator or SPA instruction. Again control circuit 106 performs the required modification to counter 107, typically by generating an extra increment pulse. The present invention relates to a new specialized skip-type instruction.

Also shown in FIG. 1 is input-output circuit 110. This circuit provides the interconnection between the accumulator 102 and peripheral devices such as card readers and punches, tape read-and-write apparatus, keyboard devices and other similar input-output apparatus. The connection to one or more of these input-output devices is represented in FIG. 1 by the lead 111 from input-output circuit 110.

In typical input operation, data are received on channel 111 and, after standard processing by input-output circuit 110 (e.g., to strip away synchronizing pulses) are delivered to accumulator 102. It will be assumed that the data are formatted in eight-bit bytes, with each bit appearing on one of eight separate input-output leads. Thus, in the case of a teletypewriter input, for example, it will be assumed that eight separate leads are provided as the output from the block labeled TTY and identified by the numeral 115 in FIG. 1. When a particular input device is inherently serial in nature, standard serial-to-parallel transformation is accomplished in input-output circuit 110. The assumed eight-bit byte format may be arranged to correspond to the standard seven-bit ASCII code format and may then include a parity or check bit. For purposes of definiteness, an even parity condition (an even number of ones in the eight-bit byte) will be considered to indicate an error; odd parity, of course, indicates no error or (on some occasions) an even number of bits in error. It will be assumed that the occurrence of a non-zero even number of bit errors is infrequent enough to not require error checking. The system of FIG. 1 is arranged to receive from input-output circuit 110 one eight-bit byte at a time. Readiness to accept a new eight-bit sequence is signalled to the input-output device by an appropriate signal, such as a set flag or flip-flop at input-output circuit 110.

Before an eight-bit pattern is permitted to be stored in memory 100, however, it is necessary that a check be made as to its accuracy. In prior art systems not involving the techniques of the present invention it was typically necessary to execute an extensive sequence of operations on the data sequence stored in accumulator 102.

In the present invention an additional instruction, referred to as the Skip on Odd Parity (SOP) instruction, is conveniently executed with each input-output instruction. The SOP instruction and associated hardware is arranged to be identical (except as noted below) in effect to other skip instructions insofar as the control sequence for effecting the operations associated with each phase of the instruction is concerned. However, additional circuitry indicated in FIG. 1 as SOP circuit 120 and OR circuit 125 are also conveniently utilized. The SOP circuit 120 provides a condition upon the actual (additional) incrementing of the program counter 107. That is, just as other non-jump instructions cause a single increment in the count stored in program counter 107 in response to a pulse generated by control circuit 106, so does it happen in the present invention that counter 107 is incremented in response to such a signal. The signal causing this incrementing is shown in FIG. 1 as appearing on a lead 121 as mentioned above. The signal appearing on lead 121 is also (in one embodiment) logically ANDed with a signal generated within SOP circuit 120. The output of SOP circuit 120 then provides an additional incrementing signal for incrementing program counter 107. The details of SOP circuit 120 and the manner in which this ANDing is provided will be described below with reference to FIGS. 2 and 3.

Figure 2:
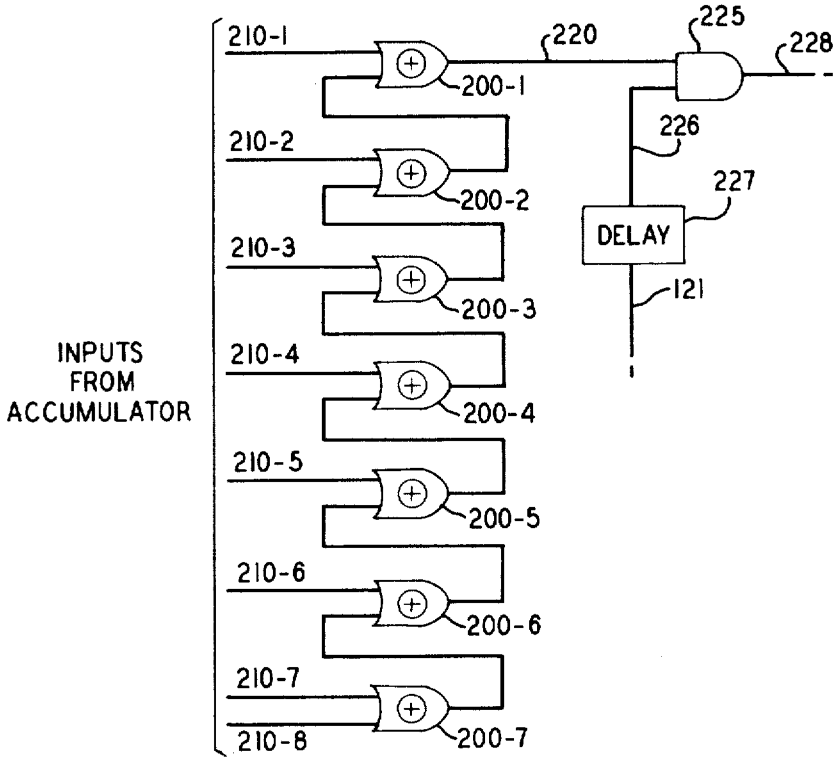
FIG. 2 shows a generalized version of circuitry useful for modifying a minicomputer in the manner shown in FIG. 1.

FIG. 2 shows a simple logic configuration for performing the required parity check operation indicated in FIG. 1 by the block. In particular, there is shown a plurality of exclusive-OR circuits 200–1 through 200–7. One input from each of the exclusive-OR circuits 200–1 through 200–6 is arranged to be connected to a single bit of the register the contents of which are to be used for generating a parity signal. That is, leads 210–1 through 210–6 are connected to respective bit positions in the register for which parity is to be calculated, typically accumulator 102 in FIG. 1. Exclusive-OR circuit 200–7 on the other hand has both of its inputs 210–7 and 210–8 connected to corresponding bits in the register for which parity is to be determined. Additionally, the second input for exclusive-OR circuits 200–1 through 200–6 are interconnected with the outputs of the other exclusive-OR circuits in the manner shown.

The effect of the interconnection of exclusive-OR circuits 200–1 through 200–7 with each other and with the appropriate bits of the register under test is to generate an output signal on lead 220 whenever an odd parity (an odd number of 1's) is found to exist for the contents of the register under test. The output on lead 220 is supplied as an input to AND gate 225. The other input to AND gate 225 is connected to a pulse source on lead 226. The pulse source typically assumes the form of a clock signal generated by control unit 106 in FIG. 1 upon the execution of an SOP instruction. To simplify the circuitry required, the pulse generated on lead 121 in FIG. 1 (which is used to advance the count of program counter 107) is used to derive the pulse input to gate 225. Thus a delay unit 227 is connected to lead 121 to produce on lead 226 a delayed replica of the pulse on lead 121. The output from AND gate 225 on lead 228 then provides the signal necessary to increment program counter 107 as described above in connection with FIG. 1.

The effect of introducing the circuitry of FIG. 2 to supply the functions of SOP circuit 120 is quite apparent. Thus in addition to the increment pulse delivered on lead 121 to program counter 107, an additional increment signal is generated on lead 228 when the parity of the contents of accumulator 102 meets a prescribed condition. Each of these two increment signals are supplied as inputs to OR gate 125. Thus when an advance signal is generated in normal fashion (as in executing any non-jump instruction) by control circuit 106, a first increment of program counter 107 is achieved. Shortly after this, while the execution of an SOP instruction is still in progress, a second increment signal is applied to program counter 107 by way of lead 228 when a determination of odd parity has been made. Thus a double incrementing, or skipping, is achieved.

Figure 3:
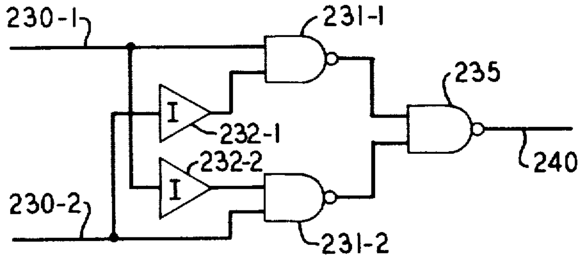
FIG. 3 shows a specific hardware configuration for realizing a basic circuit appearing in the circuit of FIG. 2.

Each of the exclusive-OR circuits **200–*i*, $i = 1, 2, \ldots 7$, in FIG. 2 may take the form shown in FIG. 3. FIG. 3 shows each of two input leads 230–1 and 230–2 connected to one input of respective AND gates 231–1 and 231–2. Additionally, the inputs on leads 230–1 and 230–2 are inverted by inverter circuits 232–1 and 232–2 respectively. These inverted signals are applied as the other inputs to AND gates 231–1 and 231–2 are connected through AND gate 235. The output of AND-gate 235 on lead 240 then provides a true or 1 signal whenever either one of, but not both of, input leads 230–1 and 230–2** have applied to it a true or 1 signal.

All of the logic building block circuits described above are of standard design. Particularly useful component circuits for this purpose are those selected from the Digital Equipment Corporation line of circuit modules. Although a positive logic scheme is convenient in implementing the above circuitry, other equivalent techniques may be substituted when appropriate.

The method of operation of the circuitry shown in FIG. 1 will now be traced using a typical sequence of operations. In particular, it will be assumed that it is desirable to transfer 10 words stored in memory 100 to an output device such as data set 150 or teletypewriter 115. It will be assumed that the information desirably transferred is stored in memory 100 at locations 500 through 511 (where the locations are given in octal notation). It is further assumed that the data are stored as seven bit right adjusted binary numbers, and that an eighth bit just to the left of the most significant data bit will be used as the parity bit. A simple program listing for the required transfer using a DEC PDP-8/L computer with appropriate comments is the following:

| Memory Location | Operation or Data | Comments |
|---|---|---|
| **100** | CLA | Clear the accumulator. |
| **101** | TAD 120 ) | Initialize location 121, which will |
| **102** | DCA 121 ) | be used as a pointer, to point to location **500**. |
| **103** | TAD 122 ) | Initialize location 123, which will |
| **104** | DCA 123 ) | be used as a counter, to the two's complement of the number of words to be transferred. |
| **105** | TAD I 121 | Add to the accumulator the contents of the memory location specified by the contents of memory location **121**. This loads a data word into the accumulator. |
| **106** | SOP | Skip the next instruction if the parity of the eight low order bits in the accumulator is odd. |
| **107** | TAD 124 | Add a parity bit to the contents of the accumulator. |
| **110** | LXX (TLS for TTY) | Transfer the contents of bits **4-11** of the accumulator to the data set and have the data set transmit them. |
| **111** | CLA | Clear the accumulator. |
| **112** | DPSF (TSF for TTY) | Skip the next instruction if the data set flag is up. The flag is up only when the data set is ready to receive a new command. |

| | | |
|---|---|---|
| 113 | JMP 112 | Jump to location 112 because the data set was busy. |
| 114 | ISZ 121 | Increment the contents of location 121, which is the pointer. |
| 115 | ISZ 123 | Test the counter (location 123) to see if all $12_8$ words have been transferred. |
| 116 | JMP 105 | Jump to location 105. More data to be transferred. |
| 117 | HLT | Halt, all done. |
| 120 | 0500 | Constant used to initialize location 121 as a pointer. |
| 121 | — | This location is used as a pointer to the word to be transferred. |
| 122 | 7766 | Constant (two's complement of $12_8$) used to initialize location 123 as a counter. |
| 123 | — | This location is used as a counter to tell when all $12_8$ words have been transferred. |
| 124 | 0200 | This location contains a ONE in bit 4 which is the parity bit position. |
| 500 | — ) | Data to be transferred— |
| | ) | |
| 511 | — ) | seven bits, right adjusted. |

While the above-detailed description has proceeded in terms of an SOP instruction, it is clear that equivalent circuitry can be provided in appropriate cases based on an even parity or that the program can be modified to generate even parity. Only a simple modification to the terminals at which the appropriate signals are obtained is required. Further, although FIG. 1 shows SOP check circuit 120 as having only a single output lead for providing a simple increment to program counter 107, it is clear that any number of other output leads may be generated as required. For example, programming considerations may require that two locations be skipped upon detection of a single parity error. What is required then is that two pulses be generated and supplied to increment program counter 107. This may be accomplished, for example, by adding another delay unit (with a slightly larger delay than unit 227) and another gate like 225 with its output connected to (enlarged) OR circuit 125.

While the "extra" incrementing signal generated on lead 228 was shown to be derived in part from a delayed replica of the normal advance pulse appearing on lead 121, it is quite apparent that an equivalent, appropriately timed signal may be generated by control circuit 106 in the course of executing an SOP instruction.

Numerous and varied other modifications and adaptations of the above-described method and apparatus will occur to those skilled in the art. In particular, different parity check circuits may be used to supply the function of SOP circuit 120 as illustrated in FIG. 2. Similarly, the program listing given above is to be considered an elementary one. More efficient coding or different coding for different machines based on the principles described above will occur to those skilled in the art.

What is claimed is:

1. Apparatus comprising

A a data processor comprising 1. an addressable memory storing a plurality of program and data words,
2. addressing means for determining the location in said memory from which words are to be read,
3. means responsive to said addressing means for accessing program and data words,
4. first and second registers,
5. means for temporarily storing data read from said memory in said first register,
6. means for temporarily storing indications of program words read from said memory in said second register,
7. control means responsive to selected ones of said indications for generating control signals, and
8. a parity check circuit responsive to said control signals for generating an output signal whenever the contents of said first register assumes a predetermined parity condition; and B. modifying means responsive to said signal generated by said parity check circuit for modifying the state of said addressing means, thereby altering the sequence of accessing of words.

2. Apparatus according to claim 1 wherein said parity check circuit comprises means for generating an output signal whenever said contents of said first register give rise to an odd parity condition.

3. Apparatus according to claim 1 wherein said addressing means comprises a program counter, and wherein said modifying means comprises means for incrementing said counter, thereby effecting a skipping of one or more locations in the course of accessing words.

4. Apparatus for checking the accuracy of and for storing a sequence of input data words comprising A. a data processor comprising 1. an addressable memory storing a plurality of program words and having a plurality of locations for storing a plurality of data words,
2. addressing means for determining the location in said memory from which program words are to be read and into which data words may be entered,
3. means responsive to said addressing means for accessing program words,
4. first and second registers,
5. means for temporarily storing an input data word in said first register,
6. means for temporarily storing an indication of a program signal read from said memory in said second register, and
7. control means responsive to selected ones of said indications for generating control signals,
8. a parity check circuit responsive to said control signals for generating an output signal whenever the contents of said first register assumes a predetermined parity condition; and B. means responsive to said signal generated by said parity check circuit for modifying the state of said addressing means.

5. Apparatus according to claim 4 wherein said parity check circuit comprises means for generating an output signal whenever said contents of said first register give rise to an odd parity condition.

6. In a stored program data processor comprising a memory, the machine method for monitoring the bidirectional transfer of data words to said memory comprising the steps of A. executing an instruction directing the transfer of a data word, B. determining whether said data word has a prescribed parity condition, and
  1. whenever said data word has said prescribed parity condition
    a. completing the transfer directed at step (A), and
    b. executing an instruction specifying a return to step (A), or
  2. whenever said data word does not have said prescribed parity condition
    a. halting the transfer directed at step (A), and
    b. skipping said instruction specifying a return to step (A).

* * * * *